June 14, 1938. G. A. MOORE 2,120,900
FIBER CONTAINER AND METHOD OF MAKING THE SAME
Filed May 2, 1935 5 Sheets-Sheet 1
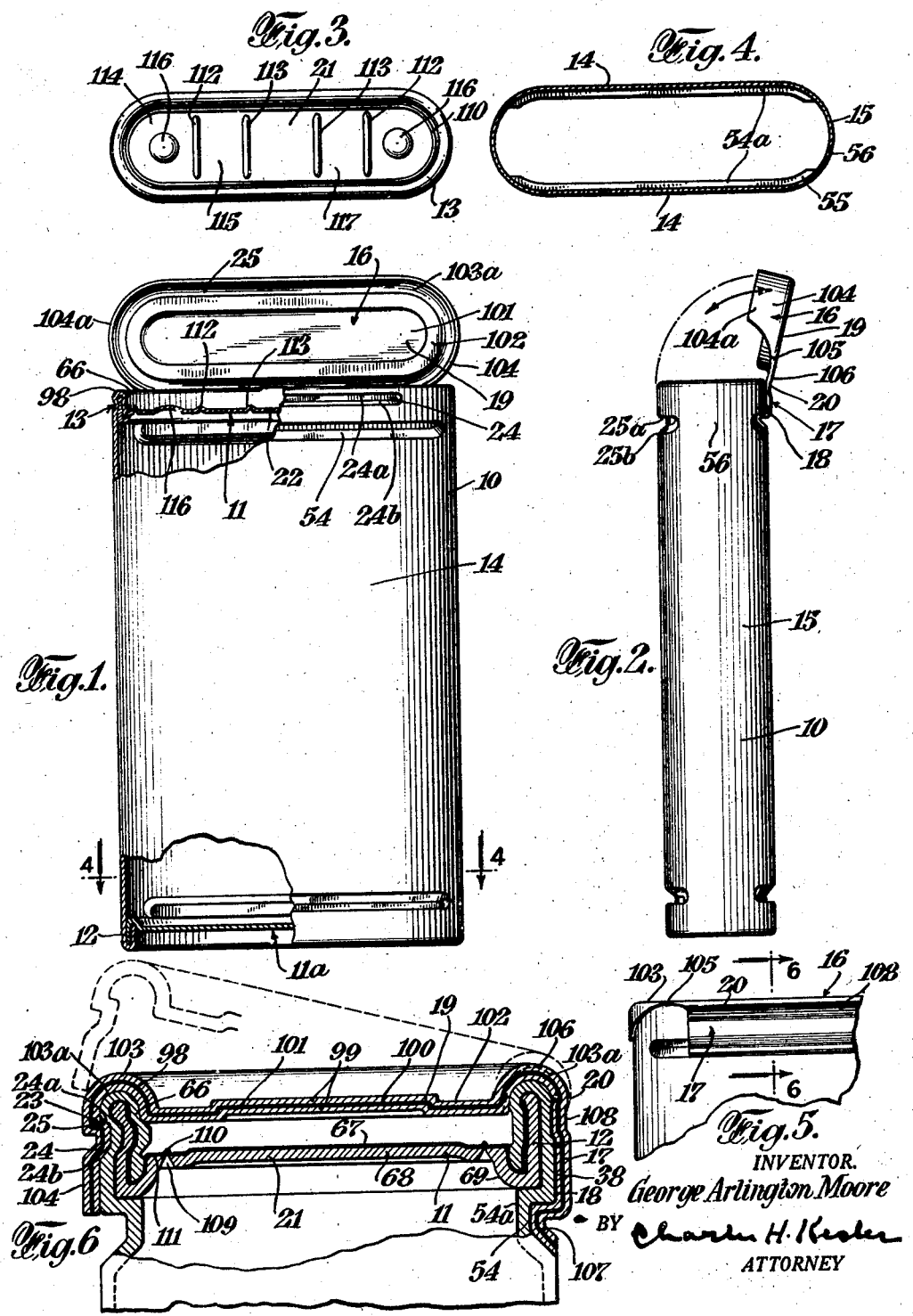
INVENTOR.
George Arlington Moore
BY Charles H. Kesler
ATTORNEY

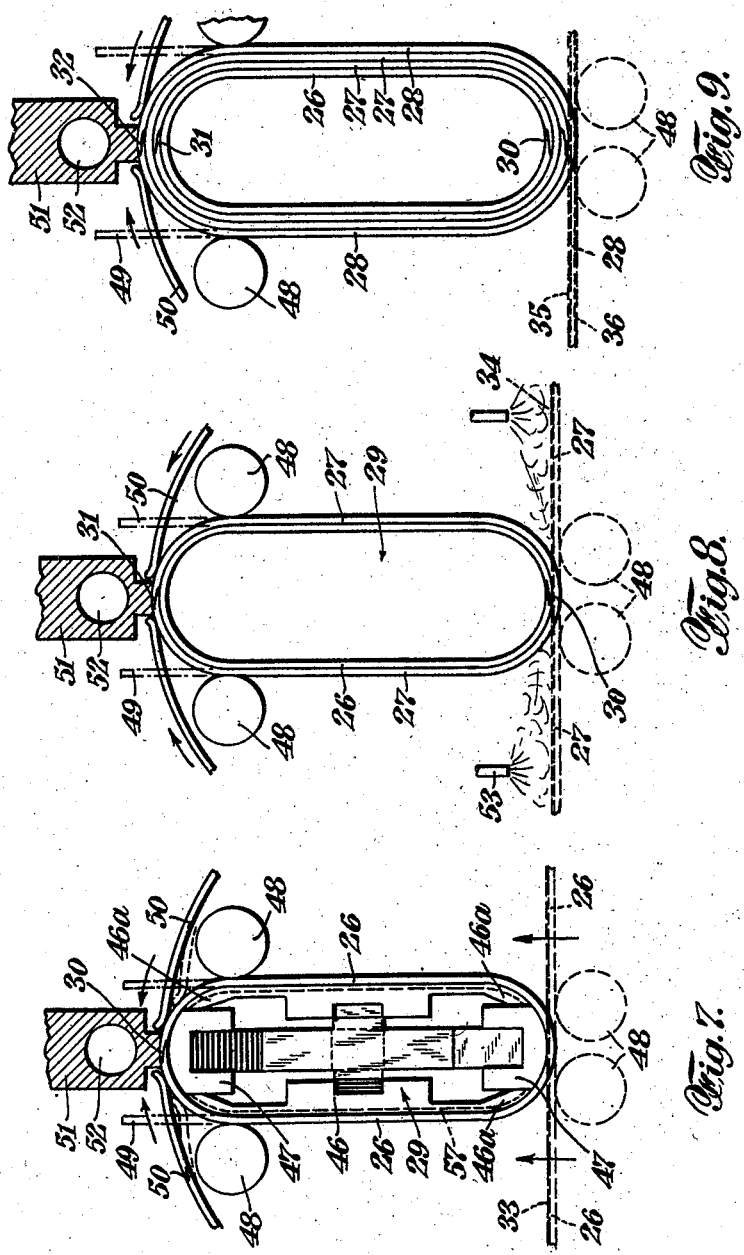

June 14, 1938.　　　G. A. MOORE　　　2,120,900
FIBER CONTAINER AND METHOD OF MAKING THE SAME
Filed May 2, 1935　　　5 Sheets-Sheet 3
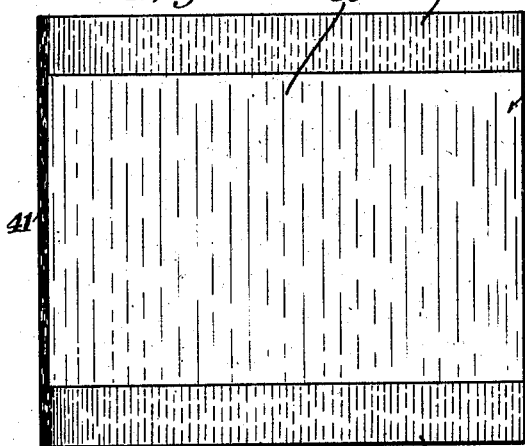
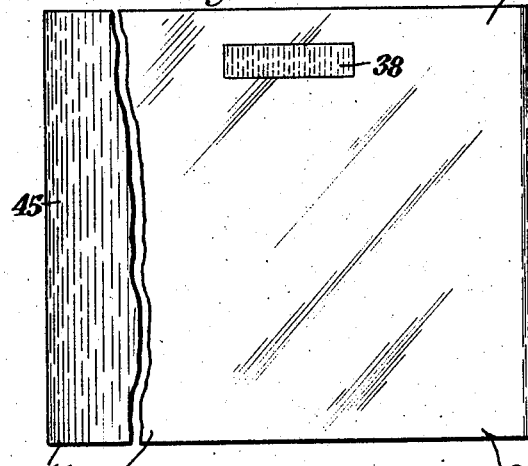
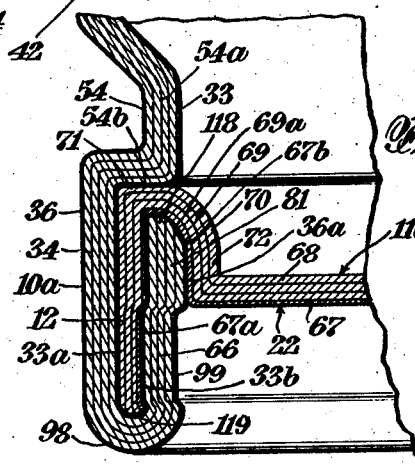
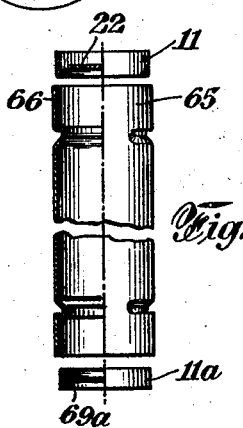
INVENTOR.
George Arlington Moore
BY Charles H. Kesler
ATTORNEY June 14, 1938. G. A. MOORE 2,120,900
FIBER CONTAINER AND METHOD OF MAKING THE SAME
Filed May 2, 1935 5 Sheets-Sheet 4
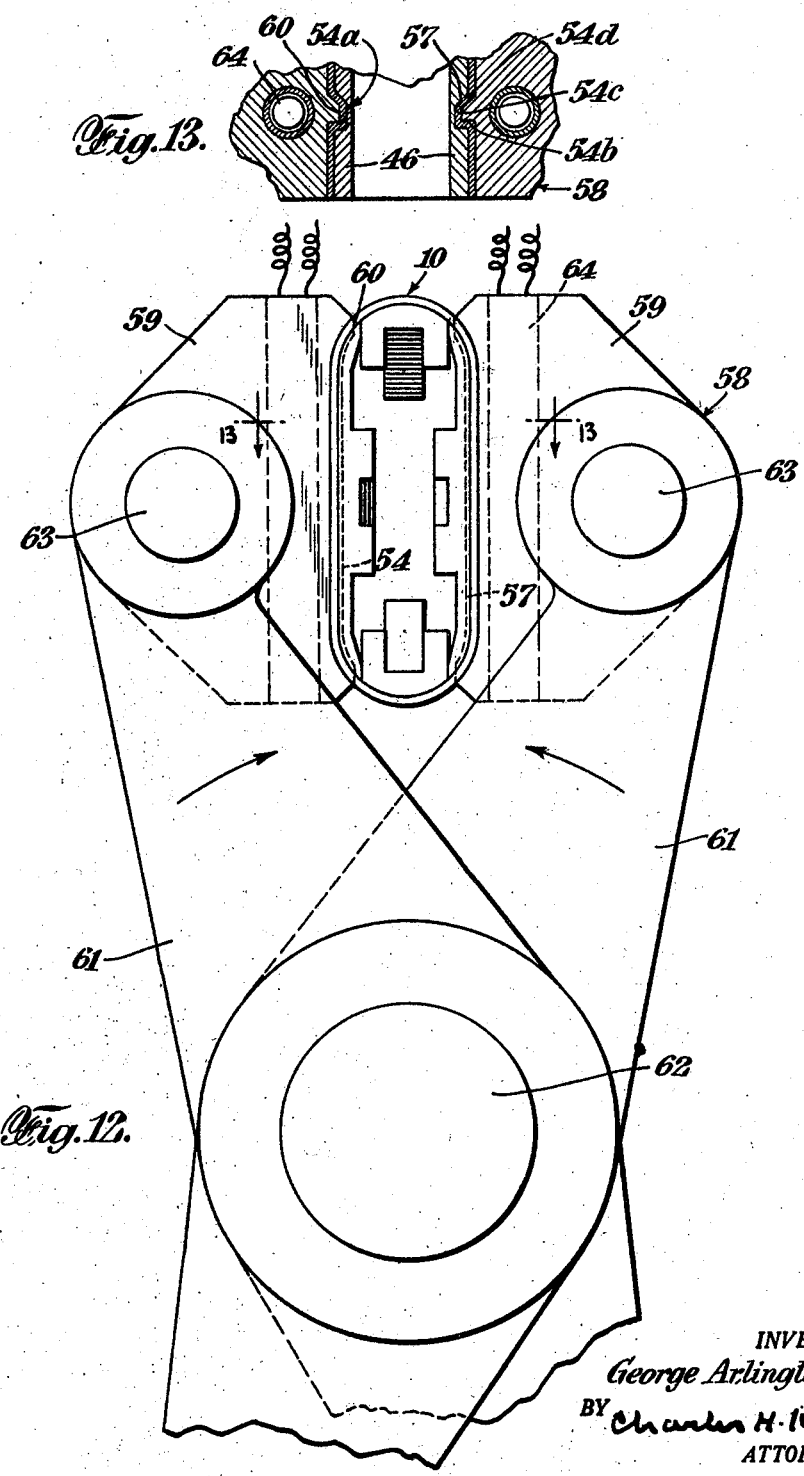
INVENTOR.
George Arlington Moore
BY
ATTORNEY

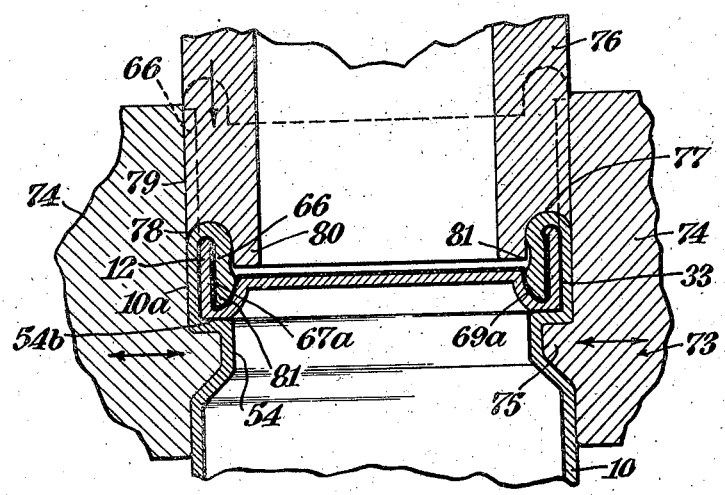
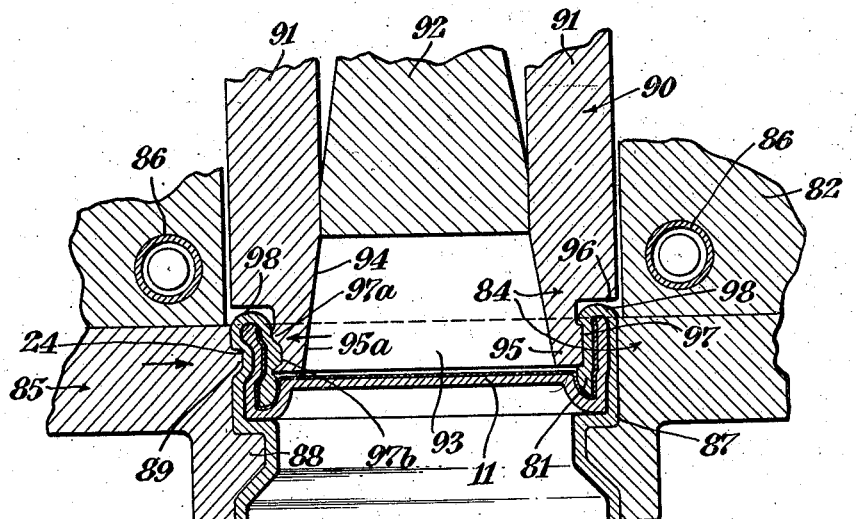

Patented June 14, 1938

2,120,900

UNITED STATES PATENT OFFICE 2,120,900

FIBER CONTAINER AND METHOD OF MAKING THE SAME

George Arlington Moore, Louisville, Ky., assignor to Humoco Corporation, Louisville, Ky., a corporation of Delaware Application May 2, 1935, Serial No. 19,403

34 Claims. (Cl. 93—39.1)

My invention relates to fiber containers and methods of making the same, and the invention has for its object to provide a container which is capable of being fabricated in quantity by machinery at low cost without causing ruptures or distortions in the material or other damage thereto, forming a strong, durable structure impervious throughout to air, moisture, and other fluids.

Further, said invention has for its object to provide a method in which the adhesives employed in the shell fabrication may be applied and activated without contaminating the machinery employed and interfering with the operation thereof, and without requiring the use of excess water or other solvent liable to render the shell soft or soggy and unadapted for use in the subsequent fabricating steps.

Further, said invention has for its object to provide a shell or similar article in which the fibrous laminations and interposed adhesive are protected against entry of moisture thereto with the exposed laps or joints hermetically cemented to render the same moistureproof.

Further, said invention has for its object to provide a shell of the character specified in which inner and outer lacquer films serve as moistureproof adhesives for sealing the exposed laps or joints against the entry of air and moisture through or into the structure.

Further, said invention has for its object to produce a tubular shell or similar article in which intermediate solvent activated adhesives may be employed without unduly entrapping excess solvent between the impervious surfaces liable to interfere with the fabricating operations.

Further, said invention has for its object to produce an air tight container in which the shell thereof is fabricated from a sheet or sheets of fibrous material having the substances forming the coatings and adhesives deposited thereon as dry films so as to render the same available in due order or sequence for use or activation as the fabrication proceeds.

Further, said invention has for its object to provide a body or shell of laminated structure capable of setting to shape rapidly when formed and of being used in the subsequent container fabricating operations under the stresses and strains to be imposed thereon.

Further, said invention has for its object to produce a fiber container of greater length than width in cross-section including substantially straight wall portions and rounded or arcuate connecting wall portions.

Further, said invention has for its object to produce a container in which the straight wall portions of the shell thereof are reinforced relative to the arcuate wall portions to form sockets at the ends of the shell of substantially gauge dimensions having uniformly smooth marginal wall portions.

Further, said invention has for its object to provide a container of the character specified in which the container is reinforced at the edge thereof with the plies of the reinforcement welded together and shaped to form a structure serving as an anchorage for a cover coacting therewith in close fitting, interlocking relation.

Further, said invention has for its object to provide a container of the character specified in which the container body and the heads therefor are formed without resultant warpage, flange wrinkles, or other distortions and are maintained to gauge shape so as to enable the assembly thereof with their walls uniformly in tight fitting or snug engagement.

Further, said invention has for its object to provide a container of the character specified in which the seams or joints thereof are substantially immune to stresses and strains imposed thereon by differences in air pressure between the inside and outside of the container resulting from changes in temperature or barometric conditions after the container is sealed in air tight condition.

Further, said invention has for its object to provide a container of the character specified in which the shell and end closure or closures or other overlapping parts are welded together against separation after assembly thereof to form a hermetically sealed, moistureproof juncture therebetween of substantial strength and durability.

Further, said invention has for its object to provide a container of the character specified in which the welding medium between the welded parts consists of a thin, dry film of thermoplastic adhesive, preferably of relatively low diffusivity, capable of being activated by heat and pressure.

Further, said invention has for its object to provide a container of the character specified in which the fibrous walls of the body and heads are interlocked to form multiple ply seams having the raw edges of the walls embedded therein and protected by the contiguous, impervious coatings or films of said walls to enhance the impermeability of said container.

Further, said invention has for its object to produce a container of the character specified in which certain of the impervious, protective coatings or films of the shell consists of a thermoplastic adhesive extending into the seams and serving as the medium for welding the plies thereof together against separation to form hermetic junctures therebetween.

Further, said invention has for its object to produce a container in which the impervious lacquer coatings or films employed function as adhesives capable of being selectively activated by a solvent, heat, or both, to effect the cementation of parts at various stages of the fabrication in the most advantageous manner without the various activations and cementations interfering one with the other or impairing the imperviousness, strength or other qualities of the resulting container.

Further, said invention has for its object to provide a container of the character specified in which the seal thereof may be readily severed and manipulated to obtain access to the container.

Other objects will in part be obvious and in part be pointed out hereinafter.

To the attainment of the aforesaid objects and ends my invention consists in the novel features of construction and in the combination, connection, and arrangement of parts, and in the steps constituting the method, hereinafter more fully described and then pointed out in the claims.

In the accompanying drawings:

Fig. 1 is a front elevation of one form of container constructed according to and embodying my said invention, parts being broken away and parts being shown in section;

Fig. 2 is a side elevation thereof;

Fig. 3 is a plan thereof with the cover omitted;

Fig. 4 is a cross-section of the container body taken on the line 4—4 of Fig. 1;

Fig. 5 is a partial rear view of the upper portion of the container;

Fig. 6 is an enlarged vertical section of the upper portion of the container on the line 6—6 of Fig. 5;

Figs. 7 to 9 are diagrammatic views illustrating certain of the steps of fabricating the shell;

Fig. 10 is a reduced plan of one form of inner or liner fiber sheet or lamination employed in fabricating the shell;

Fig. 11 is a reduced plan, with a portion broken away and reversed, of one form of outer or label fiber sheet or lamination employed in fabricating the shell;

Fig. 12 is a plan view of a portion of the apparatus for forming inwardly directed ribs in the shell;

Fig. 13 is a detail sectional view, with parts broken away, of said apparatus on the line 13—13 of Fig. 12;

Fig. 14 is a perspective of the shell or body;

Fig. 15 is an elevation partly in section showing the shell and heads in expanded relation;

Fig. 16 is a sectional elevation, with parts broken away, illustrating the method of infolding the marginal portion of the shell in forming the seam;

Fig. 17 is a sectional elevation illustrating the method of compressing and welding the intercalated portions of the seams together; and Fig. 18 is a greatly enlarged detail sectional view of the structure of the bottom seam of the container.

Referring to Figs. 1 to 6 of the drawings, the container generally comprises a tubular body or shell 10 and the flanged heads 11 and 11a disposed therein with the flanges 12 thereof spaced inwardly from the margins of the shell. The body wall and the flanges 12 of the heads are intercalated to form multiple ply seams or joints 13 providing reinforcements at the opposite ends of the container.

The invention is particularly applicable to containers which are oblong or oval in cross-section, or which have substantially straight or flat front and back wall portions 14 connected by rounded or arcuate wall portions 15 of relatively short radius. In practice, said arcuate wall portions 15 preferably describe arcs of substantially 180°.

Preferably the container includes a cover 16 having a depending tongue or tail 17 at the rear thereof cemented and anchored to the outer side of the upper reinforcement 13 at the back, as indicated at 18, the juncture between the reinforcement engaging portion or body 19 of said cover 16 and said tongue 17 constituting a flexible hinge 20 about which the cover is adapted to swing for opening and closing the container in removing the contents therefrom after the knockout 21 in the base 22 of the contiguous head 11 is entirely or partly torn out or severed. The cover 16 is retained in closed position by a detent or catch 23 including interengaging portions 24 and 25 formed in the front of the reinforcement 13 and in the cap or cover 16 respectively. The details of construction of the container and the method of fabricating the same will be more fully described hereinafter.

In my invention, the containers, which are fabricated from fiber, paper stock, or the like, to be economically produced, must be fabricated in large volume by machinery operating at high rates of speed. The difficulties involved in the quantity production of fiber containers will be more fully appreciated when it is considered that the particular container herein shown and described as one form of the invention is entirely unlike the ordinary cylindrical or square container in shape, and includes two wide, parallel, flat side portions 14 connected by arcuate or rounded portions 15 of relatively short radius.

In order to fabricate a container of the shape contemplated by me, the materials, structural features and methods must be coordinated to produce a satisfactory container in an efficient and economical manner.

In fabricating a laminated shell of oblong cross-section it is not feasible to wind a paper strip upon a rotating mandrel of corresponding shape to produce a spirally or convolutely wound tubular shell, as is the ordinary practice in forming cylindrical tubes and shells. The mechanical difficulties involved and the slowness of the methods preclude the use of such methods. Therefore, in accordance with my method, as illustrated in Figs. 7 to 11, I preferably fabricate the laminated shell 10 from separate sheets or laminations 26, 27, and 28 which are applied one at a time about a mandrel 29 of corresponding shape in superimposed relation and individually secured together at the overlaps 30, 31, and 32 thereof by a suitable adhesive. The successive laminations are also secured together in intimate union coextensively with their contacting surfaces by intervening films or layers of adhesive, and the surfaces constituting the inner and outer surfaces of the shell are coated with lacquers to render the shell impervious to air and moisture, which lacquers preferably serve in part as cementitious constituents of the container. The fibrous material, adhesives, and lacquers employed are particularly adapted for the method from the standpoint of convenience and speed in forming the shell and for producing a structure capable of conforming to the subsequent fabricating operations and satisfying the requirements for the finished container.

Because the paper or fiber component of the shell is subjected to both compressive and tensile strains in the course of the grooving and seaming operations to be described, one of the chief prerequisites in such paper stock is a long fiber of considerable strength and some elasticity. A cheap normal or super kraft paper which has been subjected to a sulfate bleach satisfies the requirements for strength.

The paper stock utilized in the shell should also offer a superior surface for adhesion and for preventing excessive absorption of adhesives, lacquers, and label inks to be employed in my method. A highly super-calendered sulfate paper responds well to printing and gumming and is not so porous as to absorb undue amounts of the materials to be employed with the paper in forming the shell. However, as both sides of the paper must as a rule be calendered, it is less adapted to knit together contiguous layers of the paper by the adhesives. Preferably, by incorporating on one of the two surfaces of the kraft paper, a sizing, such, for example, as a rosin base, which is repellant by its nature to the solvents used in lacquers and which likewise is insoluble in water, a paper may be produced which on the sized side will sustain a lacquer or adhesive film appreciably better than a highly super-calendered paper. The sizing referred to above should not be confused with either fillers, or ordinary casein or clay coatings. The ordinary coated papers are not adaptable to the fabricating operations on the shell because of the tendency thereof to shale or scale when subjected to severe deformations. A paper sized at one side as above described provides an excellent surface for supporting a film and leaves at the opposite side a surface which readily knits with the contiguous film of adhesive or lacquer. A paper as thus produced may be more readily wound about the mandrel 29 in forming the shell because such paper is less elastic or springy than super-calendered stock.

As illustrated diagrammatically in Figs. 7 to 9 the several fiber sheets or layers 26, 27, 28 composing the shell 10 are cut to size and coated, either before or after the cutting, with various adhesives and lacquers deposited thereon as dry films.

The fiber sheet 26 which is to form the inner layer or lamination of the shell has deposited upon the inner surface thereof a thin film 33 (Fig. 7) of thermoplastic lacquer. The fiber sheets 27 which are to form the intermediate or bulk forming layers or laminations (two such being illustrated as one example) have deposited upon the inner surface thereof a thin film 34 (Fig. 8) of suitable adhesive or glue. The fiber sheet 28 which is to form the outer layer or lamination of the shell has deposited upon the inner surface thereof a film 35 (Fig. 9) of a suitable adhesive, and upon the outside thereof a film 36 of a high gloss, transparent, non-thermoplastic lacquer, preferably covering suitable printing 37 (Fig. 14) upon the sheet 28 constituting or forming a label.

The thin thermoplastic film 33 constituting the inner liner of the shell while substantially moistureproof may be activated to render the same adhesive by certain solvents other than water, and preferably other than alcohol, the activation being assisted by a mild degree of heat. By virtue of this characteristic of the lacquer 33 it is possible to utilize the same to seal the seam or overlap 30 without the addition of another adhesive as hereinafter described. The thermoplastic adhesive film 33 may also be activated by heat without application of solvent to render the same tacky at temperatures in excess of those employed in forming the overlap or seam 30 for the purpose of hermetically welding together the walls of the end closures or heads 11 and 11a and the shell 10 to form hermetic joints or seams 13, as hereinafter more fully described.

The lacquer 33 preferably comprises a nitrocellulosic base having incorporated therein properly proportioned amounts of synthetic resin and plasticizer. The composition 33 is substantially waterproof, because of its nitrocellulosic and resinous composition. The thermoplastic property of the film 33 is due first to the plasticizer employed which is such that its solvent action increases with the temperature and second to the resinous component which is naturally thermoplastic. By proper selection and concentration of plasticizer and resin, the thermoplasticity of the lacquer may be controlled within fairly accurate limits. The solvent softening characteristic is predicated largely upon the solubility of the nitro-cotton in the solvent used. The solubility is considerably accelerated when accompanied by heat, and for this reason the action of the solvent in rendering the material adhesive or tacky is accelerated by the application of mild heat at say, for example, a temperature of 150° to 160° F.

While I do not desire to be limited to any particular composition for the thermoplastic lacquer or adhesive employed as the film 33, it must nevertheless possess the properties satisfying the requirements of the invention. The thermoplastic adhesive I employ not only serves as a moistureproof, impervious inner liner or lacquer coating for the shell but also serves as an adhesive capable of being activated by heat without solvent at desirable temperatures for effecting the welding together of the walls of the shell 10 and flanges 12 of the heads as more fully described hereinafter, and, if so desired, of being activated by solvent in the presence of heat at lower temperatures for the purpose of sealing the overlap or seam 30.

The composition employed for the film 33 is preferably plasticized to coordinate the thermal responsiveness thereof and its flexibility so that it may be deposited upon the sheet 26 as an extremely thin, dry film substantially free from brittleness and free from tack at the lower temperatures employed in the fabrication of the container, and preferably devoid of odor, and so that when activated by heat at higher temperatures it softens without tending to flow or penetrate into the paper to which it has been applied to an extent which would cause the dissipation thereof as a film and render said film unavailable for welding the parts together. In my invention the film 33 functions better for effecting the welding as the thickness thereof approaches a minimum, for example a thickness as small as .0008" or less has been found very effective. The composition is capable of being activated by heat at temperatures, say, above 150°–165° F., but preferably not appreciably in excess of the carbonizing temperature of the paper, for effecting under pressure the instantaneous welding together of the closely fitting parts of the container as hereinafter more fully described.

In order to function properly in the fabricating process and produce an article of desirable qualities, the adhesives employed for securing the laminations or plies 26 and 27 together and deposited as dry films 34 on the sheets 27 should be preferably such as to require very little, if any, water or moisture to activate them during the shell fabricating operation. The adhesive should also be flexible when dry without becoming brittle, granular, or crystalline such as to render the same incapable of sustaining the fabricating pressures. I prefer for this purpose either animal base glues which may be softened by steam, nitro-cotton lacquers capable of being activated by more volatile solvents, or thermoplastic lacquers containing rubber or the like capable of being activated by heat. All of such adhesives may be activated before the ply is applied without requiring the presence of excess water or moisture, if any at all, so that the shell dries out quickly or sets while being fabricated, thereby obviating the tendency of the material to warp, shrink, or become distorted. Adhesives of the general type enumerated above together with the fiber components form a shell wall of set shape combining stiffness with flexibility so that the subsequent container forming operations can be performed efficiently.

While the use of thermoplastic adhesives is an advantage because no water is required as the activating agent, the heat and pressure required to work the same involve mechanical difficulties when containers are fabricated in quantity by machinery. I therefore prefer at present to employ the less expensive solvent activated adhesive which requires the use of less pressure and heat in the fabrication of the shell. A bone glue, suitably plasticized if so desired, is a quick drying and setting, flexible adhesive which gives body to the shell without becoming brittle or granular and satisfies the requirements of the method as to working. This substance as a dry, non-tacky film 34 can be activated by a small increase in moisture content, for example a 10% increase in moisture applied as steam or vapor, while to apply the same adhesive in a liquid state at the time of fabrication of the shell would require a vehicle of 50 to 85% water. I thus minimize the possibility of entrapping excess moisture within the body wall liable to weaken the structure thereof so that it cannot hold up while wet under the pressures applied during the subsequent operations. The method of fabricating the shell step by step with slight intervals between the laminating operations as hereinafter described is also conducive to the liberation of excess moisture. The method is greatly accelerated by the use of such an adhesive, because prolonged drying which would also cause distortion, shrinkage, or warping of the shell is unnecessary, and the shell when fabricated is immediately available in set or gauge form for the subsequent fabricating operations.

The film 36 forming an impervious coating upon the outer side of the printed label or sheet 28 is a lacquer, such for example as a glyptal resin lacquer, of high gloss and transparency having little or no thermoplasticity compared to that of the thermoplastic adhesives employed so that the coating 36 is not affected by the heat applied during the shell and container forming operations.

The adhesive film 35 upon the inner surface of the label sheet 28 for securing the sheet 28 to the contiguous inner sheet 27 preferably comprises a lacquer having an affinity for the coating 36 to enable the cementation of the lamination 28 at the overlap 32. The adhesive comprises a high viscosity nitro-cotton dissolved in low boiling point solvents to produce as viscous a solution as can be handled on standard lacquer coating machinery. The high viscosity substance used to form the film 35 may be more readily activated by a volatile solvent than a low viscosity cotton, and is less liable to penetrate the paper.

The dry lacquer film 35 at the time the sheet 28 is applied about the contiguous bulk forming laminations of the shell may be readily activated by a suitable volatile solvent to enable the sheet 28 to be cemented to the contiguous fiber lamination 27 of the shell, and the lacquer portions 35 and 36 at the overlap 32 to unite or knit in forming a strong, moistureproof juncture or lap seam at 32.

In some instances it may be preferable to employ a bone glue like that applied to the bulk layers 27 as the adhesive film 35. In such event, before the outer sheet 28 is to be applied in forming the shell, the bone glue may be activated by steam including therein a solvent vapor which will be effective to soften the lacquer coating 36 at the overlap 32 and thereby effect intimate moistureproof union of the overlapping parts.

The outer sheet 28 (Fig. 11) is also provided with a section 38 of thermoplastic adhesive applied directly to the lacquer surface 36 at the outside of the sheet. The section 38 is capable of being activated by heat at a temperature of about 150° to 160° F. or more, such temperature being insufficient to activate the other thermoplastics or lacquers employed, which are more inert to heating effect. The thermoplastic section 38 is positioned so as to cement the tongue 17 of the cap 16 to the reinforced seam 13 of the completed container as hereinafter more fully described.

The coatings on inner and outer sheets 26 and 28 employed in forming the shell may, if so desired, be modified as shown in Figs. 10 and 11. The inner side of the sheet 26 as shown in Fig. 10 has applied thereto a dry film of lacquer 39 forming an impervious, moistureproof liner which may be, if so desired, composed of a heat immune or non-thermoplastic substance like that of the film of lacquer 36 on the outer side of the sheet 28 as above described. The inner side of the liner sheet 26 is shown coated along the opposite marginal portions thereof which are to constitute the ends of the shell with a thermoplastic cement 40, preferably applied directly upon the coating 39, having the same composition as the inner thermoplastic adhesive film 33 described above, and serving when activated by heat at higher temperatures to weld the body and heads together like the film 33 does. The sheet 26 (Fig. 10) has also a narrow coating of a thermoplastic cement 41 applied thereto upon the lacquer coating 39 along the edge portion which is to form the overlap 39 with the opposite side of the sheet. The thermoplastic cement 41 is composed of a substance similar to that employed for the cement layers 40, the components thereof being proportioned however to render the film 41 activatable at lower temperatures, say at about 150°–160° F. or more. With the arrangement of lacquer film 39 and sections of thermoplastic cement 40 and 41 above described, the sheet 26 may be disposed about and conformed to the mandrel 29 as shown in Fig. 7 in tight fitting relation thereto and with the thermoplastic section 41 overlying the opposite side of the sheet. Upon the application of the required heat and pressure to the lap seam 30, the overlapping portions will be welded together without rendering the remainder of the coatings tacky, and thus precluding adhesion thereof to and contamination of the mandrel.

The outside sheet 28 as shown in Fig. 11 may be provided with an outer coating of lacquer 42 having the composition and properties of the other outside coating 36. The marginal edge portion of the sheet at the outside which is to be overlapped by the opposite marginal portion has a narrow coating or film 43 of thermoplastic cement applied thereto upon the coating 42 and composed of a substance like that employed for the thermoplastic cement 41. The opposite or inner side of the sheet 28, as indicated at 44, is coated with a film of adhesive 45, such as the bone glue above described which may be activated by moisture, preferably in the form of steam. When the sheet 28 is to be disposed about the mandrel and the superimposed layers thereon as illustrated in Fig. 9, moisture is applied to the dry film 45 to soften the same. Heat at the lesser temperature above specified and pressure when applied to the overlap 32 activates the thermoplastic cement 43 which together with the glue 45 causes the overlapping portions 32 to be effectively cemented together to form a moistureproof seam without affecting the high gloss of the lacquer coating 42 or otherwise damaging or injuring the same, and without activating the thermoplastic or lacquer portions upon the liner 26 at the inside of the shell. The provision of the layer of thermoplastic cement 43 having, unlike the high gloss lacquer 42, an affinity for the animal adhesive enables the inner and outer surfaces of the sheet 28 at the lap 32 to be effectively cemented together to form a moistureproof joint.

The lacquer films 33 and 36, or 39 and 42 are deposited from solution upon the original fiber sheets 26 and 28 and intimately united therewith without undue penetration of the fiber. The lacquers employed have compositions which render the same relatively hard but sufficiently flexible to enable the shell to be fabricated and to be then worked in forming the grooves and seams without scaling, cracking or otherwise damaging the lacquers and impairing the impervious character thereof.

The container shell is fabricated as shown in Figs. 7 to 9 upon the mandrel 29 which comprises the flat side segments 46 terminating in the arcuate marginal portions 46a and the intervening arcuate segments 47 all arranged to be expanded and contracted as shown and described in my copending application, Serial No. 735,563, filed July 17, 1934.

As illustrated in Fig. 7, the sheet 26 (shown in broken lines) is presented to the mandrel with the central portion of the sheet in substantially tangential relation to one of the arcuate sides of the mandrel. The sheet 26 is then folded over the opposite flat sides of the mandrel by suitable means, such as by a pair of rollers 48 of yieldable material urged towards each other by a suitable spring. The rollers 48 are initially positioned as shown in broken lines in engagement with the outer side of the sheet 26 and are then moved along the mandrel 29 to progressively fold the sheet 26 inwardly against the opposite sides of the mandrel and draw said sheet into a smooth, close fitting relation with the mandrel.

The projecting marginal portions 49 of the sheet 26 are then drawn or folded inwardly tightly and smoothly about the remaining arcuate side of the mandrel into overlapping relation with each other by supplementary tucking means 50 movable inwardly towards each other at points in close relation to the rollers 48, the latter at this stage remaining in clamping relation with the sheet 26 as shown in full lines.

The tucking means 50 preferably comprise spring members movable inwardly to position as shown in broken lines to cause engagement of the projecting sheet portions 49 with the mandrel, said members 50 upon continued movement thereof sliding, or skidding over the portions 49 in yieldable engagement therewith to draw the same about the mandrel tightly and smoothly and retain the parts in overlapping relation for the seam forming operation at 30.

The movable presser member or iron 51 is then actuated to apply pressure and heat to the overlap 30 for rendering the adhesive 33 (or 41) effective to secure the overlapping parts together. The member 51 has suitable heating means 52 associated therewith, the temperature thereof being controlled according to the nature of the adhesive employed as above described. The members 50 and 51 remain in the position shown during return movement of the rollers 48 in engagement with the opposing portions of the ply 26, said rollers then subjecting the lamination 26 to a second ironing or smoothing operation.

The members 50 are then disengaged from the lap seam 30 as the mandrel 29 with the lamination 26 secured thereon moves on its turret to the next station. The member 51 exerts a pressing action on the overlap 30 to reduce the thickness thereof. The action is the same for the overlaps 31 and 32.

The mandrel 29 is rotated at each laminating station on its axis 180° so that the overlaps 30, 31, 32 when formed will be located alternately at opposite ends of the mandrel in both arcuate portions 15 of the shell 10 so as to equalize the bulk thereof.

Referring now to Fig. 8, before or as the sheet 27 moves to the position shown in broken lines, the adhesive film 34 thereof is activated in a manner suited for the type of adhesive employed as above described. For example, when a moisture activated adhesive is used, steam jets 53 are employed for activating the adhesive. The lamination 27 is then applied by the rollers 48 as described for the application of the lamination 26 (Fig. 7). The rollers 48 at the second station press the plies 26 and 27 and the intervening adhesive into close relation during travel thereof in both directions, and cause the air to be exuded from between the plies so that the adhesive 34 becomes effective to cement the laminations together in smooth relation coextensively with their contacting surfaces. The edge portions 49 are folded in and overlapped by the tucking means 50 serving also to exude the air and cause the plies to adhere in uniform contact. The presser member 51 at the second station is then actuated to cause the overlapping portions 31 to adhere. Preferably such presser member 51 is also supplied with heat sufficient to quickly dry the intervening adhesive 34 at the overlap 31 and improve the adhesion between the parts.

If it is desired to apply a second intermediate lamination 27, the shell structure being illustrated in Fig. 9 as comprising such second lamination, the operation is like that of Fig. 8 except that the mandrel will be rotated 180° from the position shown in Fig. 8 to locate the second lap seam 31 at the opposite end of the container. The present method may be employed for forming laminated shell structures of various numbers of plies.

The outer ply 28 is then applied in the manner described for the application of the plies 26 and 27. The adhesive film 35 is first activated by heat, volatile solvent or moisture according to the character of the adhesive, and the rollers 48 and tucking means 50 for this station operating as above described are effective to press the layers together uniformly and cause the same to adhere. The presser member 51 at this station supplied with suitable heat at 52 presses the overlapping portions of the lap seam 32 together and the heat dries the adhesive (or activates the adhesive when the thermoplastic section 43 is employed) to secure good adherence of the overlap with the lacquered outer surface 36 or 42 of said sheet 28.

The arcuate portions 15 of the shell 10 because of their arcuate or arched shape, are relatively stiff and rigid compared to the wider, flat or straight side portions 14 which, when the shell is removed from the mandrel, tend to bow inwardly relative to the arcuate portions. In order to obviate such bowing tendency and form a shell of substantially set form, the shell while still on the mandrel is subjected at another station to an operation as shown in Figs. 12 and 13 for forming the grooves 54 and complementary inwardly directed ribs or shoulders 54a in the straight portions 14 of the shell wall as shown in the drawings. The grooves 54 extend across the side walls 14 and terminate in arcuate end portions 55 (Fig. 4) extending into the arcuate wall portions 15 for substantially 45° only so that the intervening parts 56 of the arcuate walls 15 containing the overlaps 30, 31, 32 remain smooth and uniform in contour without being deformed by rib formations.

To form the grooves 54 the side segments 46 of the mandrel 29 including the arcuate portions 46a of substantially 45° arcs are provided with grooves 57 near the opposite ends of the mandrel coextensive in length with the width of the segments 46, said grooves 57 having a cross-sectional contour corresponding to the desired form of the rib 54a. All of the grooves 54 are preferably formed at one operation by means of the exteriorly located groove forming means 58 preferably comprising a pair of oppositely disposed jaws or shoes 59 having the ribs 60 thereon complementing the grooves 57 and corresponding thereto in shape. The jaws 59 are movable inwardly to draw the material of the body wall 10 inwardly into conformation with the grooves 57 to form the ribs 54a. The jaws or shoes 59 are conveniently actuated by the cross levers 61 pivoted together at 62. The jaws or shoes 59 are pivotally mounted upon the levers 61 as indicated at 63 so that the shoes will engage the shell in parallelism and register evenly therewith.

The members 59 are preferably recessed to receive heating elements 64 located substantially on a line with the ribs 54a for facilitating the setting of the material of the ribs 54a into permanent form prior to the disengagement of the shell 10 from the members 29 and 58.

Each rib 54a is formed with a ledge portion 54b extending inwardly substantially horizontally or at right angles to the wall 10, a vertical intermediate portion 54c and an inclined portion 54d merging with the vertical part 54c and the body wall 10 and being disposed at an angle of about 45° to the horizontal or transverse plane. The portions 54c—54d serve as a strut or brace at the inner end of the shoulder 54b for receiving and supporting the thrust or pressure to be imposed thereon.

The mandrel groove 57 and cooperating rib 60 for forming the groove 54 are made deeper than the groove to be ultimately obtained, inasmuch as I have found that the groove 54 shrinks about 25% in depth after the die forming members are disengaged therefrom. The easy angular relationship of the parts 54c—54d with reference to the shell wall allows a deep groove 54 to be drawn without imposing stresses or strains upon the material beyond the elastic limits thereof tending to break down or otherwise weaken the rib.

The ribs 54a maintain the body walls in parallelism without bowing to insure the formation of sockets 65 (Fig. 14) at the ends of the shell 10 of predetermined or gauge dimensions for receiving the end closures or heads 11, 11a adapted to closely and smoothly fit said sockets 65 evenly seated upon the ribs 54a. The ribs 54a determine the positions of the heads 11, 11a within the shell in spaced relation to the projecting marginal edges 66 of the body which are to form inturned portions of the seams 13. The exterior grooves 54 may also be employed for guiding the shells from one station to another in the fabricating operation into desired relation to the various tools employed.

The ribs 54a also receive the thrust of the heads 11, 11a during the seam forming operation and obviate the need of an internal mandrel or support during such operation as hereinafter described. To this end, the grooves 54 and ribs 54a are made of substantial depth, extending inwardly beyond the projection of the inner surfaces of the flanges 12.

The drawn flanged heads 11, 11a are particularly adapted structurally for fitting the sockets 65 of the shells 10 in a smooth, close fitting relation with the wall thereof without buckling, wrinkling or ruffling in order to maintain the flanges 12 in proper relation with the wall 10 during the seam forming operation to be described and to maintain a tight relationship therewith.

The heads 11, 11a are particularly adapted for use in the fabrication of containers other than circular, and particularly containers of materially greater length than width in cross-section having radial or arcuate portions 15 of relatively short radius (substantially equal to one-half of the length of the minor dimension) connecting the flat side portions 14 of substantial or major dimension. The head and the method of fabricating the same are disclosed and claimed in my copending application, Serial No. 735,562, filed July 17, 1934, which matured into Patent No. 2,081,759 on May 25, 1937.

As may be inferred from the drawings, the head 11 or 11a is drawn from a flat laminated blank composed of a layer of foil 67 backed by one or more layers of paper 68. The laminations 67—68 are secured together by suitable adhesive preferably having elastic and good adhesive properties. The foil 67, which is disposed upon the recessed side of the head, renders the latter impervious to air, moisture, and other fluids and, because of the deformable character of the foil, retains the entire structure when formed in shape with the flange 12 thereof substantially vertical, and hence the foil component contributes in securing the close fitting relation between the flange 12 and body wall 10 above described and in enhancing the hermetic or impervious qualities of the container.

The head 11 or 11a is also drawn with a foil reinforced rib 69 (Fig. 18) formed at the juncture between the flange 12 and the base 22. The rib 69 serves to reinforce and stiffen the article about the margin thereof and to retain the same in shape against warping due to shrinkage. The rib 69 has a complementary groove 69a at the inner side of the head between the base 22 and the inner side of the flange 12 for receiving as hereinafter described the lower portion of the ply 66 of the reinforcing seam 13. The rib 69 comprises a wall portion 70 of substantially a 90° arc extending rearwardly and outwardly relative to the base portion 22 and merging with the base of the flange 12 and the periphery of the base portion 22 in substantially right angular relation thereto as indicated at 71 and 72 respectively. The reinforcing foil component 67a—67b of the flange 12 and rib 69 retains the same in definite shape or contour.

The rib 69 as thus constructed provides a yieldable or elastic connection between the bottom portion 22 and the flange 12 which compensates for shrinkage as the article dries and tends to supplement the foil 67 in keeping the flange 12 substantially normal to the base against outward expansion. The yieldability of the rib 69 also facilitates the insertion of the head 11 into the socket 65 of the shell 10 and allows the head 11 to be forced into place without causing canting, buckling, wrinkling, or other deformation of the flange 12 or bottom 22.

The squared shoulder 54b in the shell 10 effectively resists axial movement of the head 11 or 11a under the pressures or stresses applied lengthwise of the container and prevents the head from becoming dislodged therefrom when bending and canting strains are imposed thereon, the squared shoulders 54b and 71 interfitting in right angular relation with respect to side walls 14, 15 to enhance the effectiveness of the interengagement.

The shape and dimensions of the groove 69a are such as to allow the ply 66 of the seam 13 to be guided into the groove 69a and anchored therein. The straight flange portion 12 forming one wall of the groove 69a tends to prevent rocking or swinging of the interlocked end of the ply 66 relative to the arcuate wall portion 69 out of engagement with the groove, and the transverse base portion 22 of the head also serves as a brace or strut for the wall portion 69 of the groove which precludes movement thereof liable to allow disengagement of the ply 66 therefrom.

Each seam 13 is preferably formed as shown in Figs. 16 and 17 after the head 11, or 11a, is forced into the socket 65 of the shell 10 with a close, snug fit. The outer surface of the head flange 12 is therefore in intimate contact uniformly throughout with the thin, intervening film 33 (or 40) of the thermoplastic adhesive upon the contiguous surface of the shell.

In order to hold the container shell in position during the seam forming operation, I provide a chuck 73 comprising movable gripping jaws 74 disposed about the shell 10 and adapted to be contracted about the upper portion of the shell to closely grip or embrace the same without causing buckling thereof. The jaws 74 have ribs 75 thereon corresponding in shape with the groove 54 and extending into and fitting the same. A similar holding chuck is employed for engaging the lower end of the shell and the grooves therein so that the shell is supported at both ends thereof.

By constructing the shell with the grooves 54 therein and employing the chucks 73, the seam forming operation may be accomplished without requiring internal support so that after a head 11 is inserted and the seam forming operation is accomplished at one end of the container, the contents may be inserted through the other end of the container and then that end sealed as herein shown and described.

The marginal portion 66 of the shell is curled or flowed inwardly and downwardly about the flange 12 by an axially movable tubular member 76 slidably guided within the chuck 73. The member 76 has an endless, transversely arcuate groove 77 at the outer side of the lower edge thereof, said groove having an edge 78 at the outer side thereof for shearing the material away from the inner wall 79 of the chuck 73 and a prolonged guiding portion 80 at the inner side thereof for directing the inturned material towards the groove 69a.

When pressure is applied to the member 76 the latter is moved from the position shown in broken lines to the position shown in full lines (Fig. 16) to flow the material of the marginal portion 66 into the groove 69a as shown. The pressure exerted by the member 76 upon the shell 10 and flange 12 is transmitted largely on a line intersecting the relatively wide right angular shoulder 54b of the shell so that the thrust is effectively taken up by the ribs 75 of the chuck 73.

The shell wall and the groove 69a are coordinated in width to allow the ply 66 to be freely guided into the groove 69a to substantially fill the same and conform to the contour thereof, due compensation being made for any enlargement or swelling of the material (shown somewhat exaggerated at 81) resulting from the operation.

The multiple ply seam as thus formed comprises an outer portion of the shell wall, indicated at 10a, the inturned portion 66 and the intercalated flange 12 having the foil component thereof, indicated at 67a, in contact with the ply 66. An extremely thin layer of thermoplastic cement 33 (or 41) is interposed between the successive plies, the thermoplastic film upon the ply 66 being in contact with the foil 67a which is preferably lacquered and embossed to form an intersticed surface for facilitating adhesion of the thermoplastic cement thereto when activated as shown in Fig. 17.

In order to effect such activation and weld or knit the plies together, at the next stage or station the lower portion of the shell 10 is engaged below the stationary bolster 82 by a segmental chuck 83 similar to the chuck 73 (Fig. 16) which has ribs engageable with the shell grooves 54 at the lower end of the container to secure the shell in proper position relative to the bolster 82 and the operating parts thereon.

The intercalated structure or other reinforcement as shown in Fig. 16 is shaped and the plies thereof are welded together by the combined pressing and heating means indicated at 84 in Fig. 17 and adapted to engage the outer and inner sides of the seam or reinforcement 13 coextensively with the periphery thereof. The outer part of said means 84 comprises a plurality of segments 85 (preferably four) movable inwardly to engage the shell 10 as shown, and disengageable therefrom by a movement in the opposite direction, said segments 85 slidably engaging the bolster 82 in heat conductive relation thereto. The bolster 82 is provided with heating means 86 which, if so desired, may be automatically controlled to maintain the members or segments 85 at temperatures sufficiently high to instantaneously activate the intervening thermoplastic adhesive 33 or 40. The heat should be applied momentarily at temperatures appreciably in excess of the temperature at which the thermoplastic is actually activated so as to render the operation instantaneous. The segments 85 are preferably composed of a metal of high conductivity compared to the conductivity of the bolster 82 so as to facilitate the flow of heat therefrom to the seam 13.

The segments 85 at the lower portion of the inner faces 87 thereof are provided with rib portions 88 corresponding in shape and depth with the grooves 54 in the shell 10 and reinforcing the rib 54a to receive thrust during the operation. The segment 85 at the front of the container is provided upon its inner face with a transverse rib 89 having a cross-section shaped to form in the upper portion of the seam the cover locking recess 24 having a right angular shoulder 24a and an inclined lower portion 24b as shown also in Figs. 1 and 6. The segments 85 when in contracted positions as shown serve as an anvil for receiving the thrust of the expansible and contractible inner part 90 of the pressing means 84.

The mechanism 90 is constructed to operate in being expanded and contracted on substantially the same principle as the mandrel 29 shown in Fig. 7, and comprises the segments 91 (four in number) adapted to be expanded, as shown, by the reciprocating member 92. When the member 92 is moved downwardly into the enlarged space 93 provided between the tapered portions 94 of the segments 91 at the lower ends thereof, the segments 91 may be collapsed by suitable means.

The segments 91 have depending skirts 95 and 95a at the lower ends thereof providing recesses 96 at the outer sides thereof for receiving the seam 13. The segment portions 95 which operate upon the seam at the back and arcuate sides of the container have relatively shallow flat ribs 97 formed thereon for engagement with the seam, said ribs 97 being of a width less than the depth of the seam substantially as shown. The portion of the recess 96 above the rib 97 is enlarged to clear the bend or arcuate margin 98 of the seam to allow the same to freely conform to shape when the seam is compressed. The segment skirt 95a operating on the seam at the front of the container is modified in shape at points thereof aligned with the rib 89 for forming the locking groove 24 to compensate for the deformation of the wall line resulting from the formation of the groove 24 and to relieve the pressure applied to the material by the groove forming rib 89. For this purpose, the rib 97a on skirt 95a corresponding to the ribs 97 on the skirts 95 is made of less width and a recess 97b is provided on skirt 95a opposite the rib 89 so that the groove 24 may be formed and the contiguous portions of the seam may be also compressed in welding the parts together without pinching the material at this point and causing rupture or damage thereto. The structural shape of the operating face of the skirt 95a is in other respects like that of the skirts 95.

When the inner segments 91 are momentarily expanded by member 92 to compress the material of the seam against the highly heated outer anvil segments 85 which are contracted simultaneously with the operation of the segments 91, the heat and pressure applied cause the seam to conform to the desired shape and the thermoplastic to be activated to cause the plies of the seam, while subjected to pressure, to be welded or knit together in intimate contact coextensively with the areas under pressure and to a lesser extent therebeyond. The heat and pressure are applied momentarily by quickly operating both the outer and inner components 85 and 91 of the means 84 so as to effect welding instantaneously without unduly heating the fiber. Prolonged heating at the temperatures employed would otherwise tend to carbonize the fiber. When the segments 85 and 91 are retracted the container is then withdrawn.

Upon the application of pressure to the seam as above described, the surplus material is squeezed lengthwise of the ply 66 to cause the anchored portion 81 thereof to swell and expand into close fitting engagement with the foil component within the grooves 69a, and to cause the marginal portion 98 of the seam to enlarge or swell to form a rounded yieldable structure adapted for engagement with the cover 16 as hereinafter described. Such seam structure 13 is shown exaggerated in Fig. 18.

The cap or cover 16 adapted for cooperation with the top seam or reinforcement 13 of the container, as shown in Fig. 6, is formed from a drawn blank composed of outer fiber or paper laminations 99 and an intermediate foil lamination 100 secured together by a suitable adhesive to form a strong, flexible, durable structure of substantially permanent gauge shape corresponding in shape with the seam or reinforcement 13.

The body 19 of the cover comprises a flat central portion 101, a downwardly offset, reinforcing flat portion 102, a reversely directed, resilient, arcuate portion 103 (forming a complementary groove 103a at the inner side thereof for engagement with the seam 13) and a peripheral depending flange or skirt 104 including the tongue portion 17 for engagement with the outside of the container. The skirt 104 is preferably cut away at opposite sides of the tongue or tail 17, as indicated at 105, to allow the cover when in open position to clear the reinforcement 13 at the back sufficiently upon being opened to prevent entrapment of particles of the container contents between the container and cover when the latter is closed, and to allow the back portion 106 of the loop 103 to flex for facilitating the swinging engagement and disengagement of the cover 16 with the seam 13.

Before anchoring the cap 16 at 18 to the back of the seam 13, the lower edge of the tail 17 is conformed to the contour of the groove 54, providing the angular anchoring portion 107, and a transverse section 108 of high compression is formed therein for determining the location of the line of bend 20. The inwardly directed locking rib 25 is preferably formed at the same operation in the intermediate front portion of the flange 104 for registry with locking groove 24 when the cover is closed. The rib 25 includes a sharp shoulder and an inclined or tapered lead portion forming a spring lock reinforced by the foil component and adapted, when the cover is closed, to firmly engage in the correspondingly shaped recess 24 in the front of the seam 13.

The tail 17 is placed in position over the thermoplastic adhesive section 38 applied to the back surface of the seam 13 as described in connection with Fig. 11, and heat and pressure are applied to the juncture in order to activate the adhesive and cement the tail 17 to the back surface of the seam 13 with the angular portion 107 interlocking with the groove 54. The interengagement between the parts 54 and 107 provides a mechanical anchorage, supplementing the adhesion in resisting stresses on the anchorage 18 when the cover 16 is opened and closed. The stiffened area 108 determines the location of the line of bend, fulcrum or hinge 20 of the cover, and the line of connection for the flexing strap-like hinge portion 106 (Fig. 2). The hinge line 20 is located at the juncture between the curved marginal portion 106 and the tail 17.

The width of the groove 103a is slightly less than the normal thickness of the yieldable portion 98 of the reinforcement 13 so that when the cover 16 is closed the parts fit each other closely with a resilient engagement like a gasket.

When the cover is closed and locked by interengagement of the parts 24 and 25 the inner side of the arcuate portion 103 reinforced and trussed by the transverse reinforced center portion 101—102 is squeezed tightly into engagement with the inner side of the reinforcement 13 to close the mouth of the container like a stopper.

A flange drawn from a blank composed solely of paper stock, tends to flare out and lose its shape, and this is particularly true when the flange is drawn with curving portions of reduced radius. When a curving flange is drawn from a paper blank without the foil, the excess material, due to radius reduction, is concentrated and compressed in the curving marginal portions of the flange, causing the material to become hard, dense, and brittle and unlikely to hold its shape unless reinforced in the manner herein shown and described.

The laminated structure of the flange 104 at the rounded or curved ends 104a thereof particularly satisfies the requirements for gauge dimensions and permanency of shape. When such portions are drawn surplus material is concentrated therein and the foil component or lamination tends to corrugate or pleat at said rounded ends 104a to form a solid, stiff structure not liable to expand outwardly and lose its shape, such as would be the case if paper stock were used without the foil lamination. The foil 100 incorporated in the structure of the cap 16 renders the wall thereof impervious and overcomes or opposes the natural tendency of the drawn paper component to expand or flare outwardly, making it possible to produce a cap of permanent gauge dimensions having a tight fitting, gasket-like interengagement with the reinforcement 13, and capable of being effectively locked in closed position.

The laminated structure of the cap 16 including the use of flexible foil and a flexible adhesive insures the formation of a flexible hinge at 106 capable of being flexed repeatedly without material deterioration or breakage thereof, the paper and foil components cooperating to form a strong, durable, flexible hinge, although either material, if used alone, would be unsatisfactory for the purpose.

The laminated head 11 and the knockout 21 in the base 22 thereof are preferably formed at one operation by the method disclosed and claimed in the aforementioned Patent No. 2,081,759.

In my invention, the foil 67 of the heads 11 constitutes a deformable, pliable impervious outside layer which is less tenacious than the fiber component 68 of the head for retaining the head in set formation and rendering the wall thereof impervious to air and moisture. By forming about the margin of the base portion 22 a score, weakened line, or cut in the fiber component as indicated at 109 and leaving the foil component 67 substantially intact, I am able to form a knockout which comprises both components of the head without impairing the imperviousness of the container.

The scoring 109 is preferably formed as an endless V-shaped groove or cut extending into the fibrous material 68 contiguous to the bead 69. The apex of the cut 109 terminates short of the foil 67 substantially at the intervening flexible adhesive employed for securing the laminations together. The cut 109 is formed by a correspondingly shaped tool which plows into the paper spreading the material laterally to minimize compression on the foil tending to sever, bite into, or otherwise damage the metal. The foil 67 is relieved along the cut during the formation thereof, resulting in a crease or rib 110 formed in the foil without appreciable reduction in the thickness of the metal line thereof. The rib 110 serves as a line of tear for allowing the knockout 21 to be torn or severed with a clear cut about the shearing edge 111 provided at the juncture of the rib 69 therewith. The rib 69 also serves as a yieldable buffer between the knockout 21 and the flange 12 for protecting the knockout against stresses liable to fracture the same prematurely. The shoulder 54b in the shell, the rib 69, as reinforced by the foil 67 and the seam ply 66, and the welding of the seam plies together mutually contribute to form a strong, rigid structure about the knockout 21 capable of protecting the same and resisting deformation or distortion when the knockout is sheared or torn out.

I also preferably form means in the knockout 21 for facilitating the manipulation in breaking the seal. This means comprises outwardly projecting ribs or beads 112 and 113 formed in the oblong base 22 of the head 11 at the time the latter is drawn. The ribs 112 and 113 extend transversely across the strip-like knockout 21 formed in the base 22 and terminate contiguous to the cut 109 at opposite sides. The ribs 112 and 113 are spaced from each other and from the end of the knockout to form the sections 114 and 115 capable of being swung or folded about said ribs 112 and 113 serving as hinges or lines of bend. The section 114 is preferably stiffened or reinforced by forming centrally therein an outwardly convex knob or protuberance 116 therein. The arrangement is preferably duplicated at both ends of the knockout to allow manipulation from either end.

When the knob 116 is pressed by the ball of the finger, the section 114 is severed and moved inwardly to a position under section 115. By now exerting an upward pull with the finger the section 115 is severed and both sections 114—115 may be lifted about their lines of bend at 112 and 113. The sections 114 and 115 are now in position to be pressed together by the fingers so as to form a tab for tearing out the entire knockout if so desired. The seal 21, however, need not be broken beyond the rib 113 so as to leave the major portion 117 of the seal 21 intact. When a portion of the contents of the container is removed, the partially severed flap 114—115 may be pushed back into the mouth of the container before the cover 16 is closed so as to maintain the contents in better condition.

In my invention, the fiber laminated shell wall 10 as more clearly illustrated in Fig. 18 is rendered substantially impervious to air and moisture by the moistureproof lacquer films 33 and 36 deposited upon the inner and outer surfaces thereof and extended into the seams 13, as indicated at 33a, 33b and 36a. The walls of the heads 11 and 11a are also rendered likewise impervious by the outwardly facing foil laminations 67 embedded within the seam at 67a between the plies 12 and 66 and extended into the groove 69a as indicated at 67b. The raw edges 118 of the shell 10 are thus seated in the grooves 69a protected by the impervious foil envelopes 67b, the foil portion 67b and the impervious film portion 36a being in contact with each other in each groove 69a to enhance the imperviousness at the juncture thereof. The raw edges 119 of the heads 11, 11a are in like manner enclosed by the impervious film portions 33a—33b. The soft foil layer 67a forms a gasket seal, supplementing the welds between the seam plies to effectively prevent passage of air and moisture through the seam at the junctures of the plies.

I also preferably employ the inner and outer lacquer films 33 and 36, at least in part, as heat or solvent activated adhesives for sealing the inner and outer lap seams 30 and 32 to render the same substantially moistureproof and more indurant and prevent entry of moisture and air through such exposed seams 30 and 32 into contact with the inner plies 27 and the adhesive films 34 and 35, and thus allowing the employment of adhesives which are moisture activated for securing the laminations together.

The impervious shell wall 10 as thus formed is thoroughly protected at the inner and outer surfaces, the raw edges 118 and lap seams 30 and 32 thereof against the entry of moisture to the interior of the structure liable to impair the strength and durability thereof and cause the same to ultimately leak.

The use of a thermoplastic adhesive, such as the nitrocellulose lacquers plasticized to have the properties above described, for welding or knitting the plies of seams, reinforcements or other overlapping parts together marks a distinct advance in the art of fiber containers. By employing relatively thin films of thermoplastic lacquer having a relatively low diffusivity when activated, I am able to weld or knit together opposing parts having porous or intersticed contiguous surfaces by subjecting the parts and the film of adhesive disposed therebetween in a dry state momentarily to the action of pressure and heat to form instantaneously a hermetic seal between the parts and a strong durable juncture incapable of being ruptured or released in ordinary usage. While I do not desire to be bound by a theory of operation, it is believed that in the method described the activated adhesive because of its low diffusivity is forced by the pressure into the interstices of the opposing surfaces and is available in its entirety for filling the surface interstices and welding the parts together in intimate contact without being excessively absorbed by or dissipated throughout the porous mass which would render the film unavailable at the immediate juncture of the parts for forming the seal and weld.

The seam 13 constructed in accordance with my invention while of simple mechanical structure is substantially air tight and remains so under the stresses and strains ordinarily imposed on the container. For example, when an air tight container constructed as herein shown and described is sealed under one condition of atmospheric pressure, variations in outside temperature or barometric conditions cause differences in pressure between the inside and the outside of the container tending to impose rupturing stresses thereon which are effectively resisted by the seams 13 when constructed in accordance with the present invention.

By forming the locking recess 24 in the seam 13 or other reinforcement simultaneously with the welding step under heat and pressure, and relieving the pressure at the rear of the recess forming rib 89 as shown in Fig. 17, a recess 24 of set shape is produced having the wall thereof under substantially the same compression as the contiguous wall portions of the seam, the successive plies of the seam including the foil 67a being deformed by the recess forming operation into interlocking relation. The cooperating catch 25 formed in the foil laminated structure of the cover 16 is also of set formation adapted to readily spring into and interfit with the groove 24 when the cover is closed. By locating the cover locking means 23 substantially contiguous to the base of the arcuate portion 103, the spring action is more effective and the parts 24 and 25 more firmly interlock.

By my invention, containers, and particularly containers having straight and arcuate wall portions, may be fabricated in quantity at low cost. The resulting container is strong and durable, of light weight and pleasing appearance, forming a hermetically sealed package capable of preserving the contents thereof in condition for prolonged periods.

Having thus described my invention what I claim and desire to secure by Letters Patent is:

1. In the art of making containers comprising fibrous material, the method which comprises securing a fiber sheet with a lacquer liner thereon at the time of the shell forming operation about a mandrel with marginal portions of the sheet in overlapping relation, cementing the overlapping portions together by means of the intervening portion of said lacquer liner meanwhile activated to render the same adhesive, inserting a head within the shell, and welding the latter parts together by activating the intervening portion of said lacquer liner.

2. In the art of making containers comprising fibrous material, the method which comprises forming a multiple ply reinforcement at an end of a container body, subjecting the plies to the action of laterally applied pressure and of heat and activating thereby a thermoplastic adhesive in a dry state previously disposed between the plies, and at the same operation impressing a deformation on the material at one side of the reinforcement while compensating therefor at the opposite side of the reinforcement to form the parts compressed of substantially uniform thickness.

3. In the art of making containers comprising fibrous material, the method which comprises forming separate sheets with dry films of adhesive thereon, disposing the sheets one at a time about a mandrel in superimposed relation with marginal portions of each sheet overlapping each other, the adhesive upon each sheet being activated by a solvent at the time of the application of the sheet to secure the laps of each sheet together and each succeeding sheet to a previously applied sheet.

4. In the art of making containers comprising fibrous material, the method which comprises disposing a sheet having a dry lacquer liner thereon about a mandrel and overlapping the marginal portions thereof, activating the intervening portion of said lacquer liner and cementing the overlapping portions together thereby, activating a dry adhesive film upon another sheet, and securing the sheet about and to the contiguous inner sheet by said adhesive, activating a dry adhesive film upon the inner face of an outer sheet having a lacquer film upon the outer face thereof, securing said last named sheet about and to the contiguous inner sheet by said adhesive, and overlapping the marginal portions of said last named sheet and securing the laps together by intervening activated portions of said inner and outer films.

5. In the art of making containers comprising fibrous material, the method of forming laminated shells which comprises presenting each lamination centrally thereof to a rounded portion of a mandrel having straight sides and connecting rounded portions, drawing the lamination progressively from the middle thereof towards the margins about the mandrel at opposite sides, tucking the marginal portions of the lamination inwardly and drawing the same into overlapping relation about the other rounded side of the mandrel, cementing the overlapping parts together by pressure and heat, and controlling the operation to form the lap seams alternately at one and then the other rounded sides of the shell.

6. In a container comprising fibrous material, a shell having a reinforcement at the edge thereof, and a cover having a foil laminated structure hinged to said reinforcement at the rear thereof, said reinforcement and said cover having interlocking portions formed at the front thereof for retaining the cover in closed position.

7. The method of making a container comprising fibrous materials which includes forming a shell by successively wrapping a plurality of flexible blanks about a mandrel, adhesively securing each blank to a contiguous blank throughout the contacting areas thereof during the wrapping operation by a solvent activated adhesive previously applied to the blanks as dry films, and adhesively joining the overlapping ends of each of said blanks.

8. The method of making a container comprising fibrous materials which includes the steps of coating a plurality of blanks with reactivatable adhesives, allowing said coating to dry, forming a shell by successively wrapping said blanks about a mandrel, activating the adhesive film on each blank immediately prior to the wrapping thereof, and pressing each blank into firm engagement with a contiguous blank during the wrapping operation.

9. The method of making a container comprising fibrous materials which includes coating the marginal portion of one side and both ends of a blank with thermoplastic lacquer having potential adhesive properties, allowing the lacquer to become dry, forming the blank into a tubular body with the lacquer coating inside and with the edges overlapping, securing said overlapping edges with said lacquer coating by the application of heat and pressure, inserting a flanged closure in each end of said body, and securing and sealing said closures in place with said lacquer coating by the application of heat and pressure.

10. The method of making a container comprising fibrous materials which includes applying a coating of lacquer having potential adhesive properties to the surface of a blank, allowing said lacquer coating to become dry, forming the blank into a tubular body with the lacquer coating inside and with the edges overlapping, securing said overlapping edges together by activating the lacquer coating therebetween, inserting a flanged closure in each end of said body, and securing and sealing said closures in place by activating the lacquer coating interposed between said body and the flanges of said closures.

11. The method of making a container comprising fibrous materials which includes coating the marginal portion of one side and both ends of a blank with thermoplastic lacquer having potential adhesive properties, allowing the lacquer to become dry, forming the blank into a tubular body with the lacquer coating inside and with the edges overlapping, securing said overlapping edges with said lacquer coating by the application of heat and pressure, inserting a flanged closure in each end of said body, folding the marginal portions of said body into overlapping relation with the flanges of said closures, and securing and sealing said closures in place with said lacquer coating by the application of heat and pressure.

12. The method of making a container comprising fibrous materials which includes coating one entire surface of a blank with a thermoplastic lacquer having adhesive properties, allowing the lacquer to become dry, forming the blank into a tubular body with the lacquer coating inside and with the edges overlapping, securing said overlapping edges together with the lacquer coating interposed therebetween by application of heat and pressure, inserting a flanged closure in each end of said body, and securing said closures in place by activating the intervening lacquer coating by the application of heat and pressure.

13. The method of making a container comprising fibrous materials which includes coating a blank with a dry film of thermoplastic lacquer having potential adhesive properties, forming the blank into a tubular body with the lacquer coating inside and with the edges overlapping, securing said overlapping edges with said lacquer coating, securing one or more additional blanks to said body by means of reactivated adhesives previously applied to said additional blanks as dry films, inserting a flanged closure in each end of said body, and securing said closures in place by activating said lacquer coating between the wall of said body and the flanges of said closures.

14. The method of making a container comprising fibrous materials which includes coating the marginal portion of one end of a blank with a composition having adhesive properties, allowing the coating to become dry, forming a tubular body comprising said blank with the coating of the latter inside, forming an inwardly directed rib and an external groove complementary to said rib near one end of said body, placing a flanged closure in said body in contact with said rib, curling the marginal portion of the body into overlapping relation with the flange of said closure while holding said body by means externally thereof and extending into said groove, and sealing said marginal portion and the flange of said closure together with said coating by the application of heat and pressure.

15. The method of making a container comprising fibrous materials which includes coating the marginal portion of one end of a blank with a composition having adhesive properties, allowing the coating to become dry, forming a tubular body comprising said blank with the coating of the latter inside, forming an inwardly directed rib and an external groove complementary to said rib near one end of said body, placing a flanged closure in said body in contact with said rib, curling the marginal portion of the body into overlapping relation with the flange of said closure while holding said body by means externally thereof and extending into said groove, and sealing said marginal portion and the flange of said closure together by reactivating said adhesive coating interposed therebetween and applying substantial pressure thereto.

16. The method of making a container comprising fibrous materials which includes coating the marginal portion of both ends of a blank with a composition having adhesive properties, forming a tubular body including said blank and having a uniform transverse cross section, forming a circumferentially extending internal rib and complementary external groove in the wall of said body adjacent each end thereof, inserting a flanged closure in each end of said body in contact with said ribs, folding the coated marginal portions of said body into overlapping relation with the flanges of said closures, while holding said body by means extending into said groove, and activating the coating between said marginal portions and said flanges and applying pressure thereto to form impervious closure seams.

17. The method of making a container comprising fibrous materials which includes forming a shell with an inwardly directed rib therein and an external groove complementary to said rib near one end of said shell, placing a flanged head in said shell in contact with said rib, curling the marginal portion of the shell into overlapping relation with the flange of said head while holding said shell by means externally thereof and extending into said groove, activating a dry film having adhesive properties interposed between said marginal portion and flange, and applying substantial pressure to press said marginal portion and flange into intimate contact around the entire periphery thereof.

18. In the art of making containers comprising fibrous material, the method which comprises assembling a tubular shell having an external groove and a flanged head with a dry film of thermoplastic adhesive between said shell and the flange of the head, curling the marginal portion of the shell into overlapping relation with the flange of the head while holding the shell by means externally thereof and extending into said groove, and subjecting said curled portion and flange to the action of pressure and heat to activate said adhesive and weld the parts together.

19. In the art of making containers comprising fibrous material, the method which comprises disposing separate sheets one at a time about a mandrel in superimposed relation, overlapping and cementing together marginal portions of each sheet when the same is applied about the mandrel to secure the sheet in position thereon, and reactivating a dry adhesive coating on each succeeding sheet and securing the latter to a contiguous previously applied sheet with said adhesive.

20. In the art of making containers comprising fibrous materials, the method which comprises disposing separate sheets one at a time about a mandrel in superimposed relation and with the ends of each sheet in overlapping relation, securing the overlapped ends of each sheet together at the time of application by a reactivated adhesive previously disposed upon the sheet as a dry film, and securing each succeeding sheet at the time of application thereof to the contiguous previously applied sheet throughout the adjacent surfaces thereof by means of a reactivated adhesive previously disposed upon one of the sheets as a dry film.

21. In the art of making containers comprising fibrous material, the method which comprises disposing a sheet about a mandrel with the ends thereof overlapping, cementing together the marginal portions of said sheet to secure the same in position on the mandrel, coating one or more sheets with films of reactivatable adhesive material, allowing said films to dry, applying a small amount of moisture to the adhesive coating on each of said sheets to render said coating tacky, successively disposing said adhesively coated sheets one at a time about said mandrel, and securing each succeeding sheet to the contiguous previously applied sheet with the activated adhesive coating by the application of pressure.

22. In the art of making containers comprising fibrous material, the method of forming laminated shells which comprises presenting each lamination centrally thereof to a mandrel, drawing each lamination progressively from the middle thereof towards the margins about the mandrel at opposite sides, tucking the marginal portions of each lamination inwardly and drawing the same into overlapping relation about the mandrel, cementing the overlapping portions together under pressure, and cementing the second and each succeeding lamination to the contiguous previously applied lamination under pressure by a reactivated adhesive previously applied thereto as a dry film.

23. In the art of making containers comprising fibrous material, the method of forming a laminated shell which comprises presenting each lamination centrally thereof to a rounded portion of a mandrel having straight sides and connected rounding portions, drawing each lamination progressively from the middle thereof towards the margins about the mandrel at opposite sides, tucking the marginal portions of each lamination inwardly into overlapping relation about the other rounded portion of the mandrel, cementing the overlapping marginal portions together under pressure, and controlling the operation to form the top seams at one and then the other rounded side of the shell.

24. In the art of making containers comprising fibrous material, the method of forming laminated shells which comprises presenting each lamination centrally thereof to a mandrel, drawing each lamination progressively from the middle thereof towards the margins about the mandrel at opposite sides, and cementing the second and each succeeding lamination to the previously applied lamination under pressure by a reactivated adhesive previously applied thereto as a dry film.

25. In the art of making containers comprising fibrous material, the method of forming a laminated shell which comprises presenting each lamination centrally thereof to a rounded portion of a mandrel having straight sides and connecting rounded portions, drawing the lamination progressively from the middle thereof towards the margins about the mandrel at opposite sides, tucking the marginal portions of each lamination inwardly about the other rounded side of the mandrel, and cementing the second and each succeeding lamination to the previously applied lamination under pressure by a reactivated adhesive previously applied thereto as a dry film.

26. A container comprising a tubular shell including fibrous material and a flanged head disposed therein, said head being composed of laminations of fibrous material and foil, the foil component reinforcing the fibrous component of the flange and rendering the wall of said head substantially impervious to air and moisture, the marginal portion of said shell being infolded into overlapping relation with the flange of said head and secured thereto by a previously applied and reactivated adhesive.

27. In a container, a tubular shell comprising fibrous material and having straight and arcuate wall portions, and a flanged head of corresponding shape drawn from a blank comprising fibrous material and a material of greater impermeability, said head being disposed within said shell and having the flange thereof in close fitting relation with the inner surface of said shell and the marginal portion of said shell being folded inwardly about said flange and secured thereto entirely around the periphery thereof by a reactivatable adhesive to form a multiple-ply closure seam.

28. In a container, a tubular shell comprising fibrous materials and a covering of greater impermeability than said fibrous material, said shell having straight and arcuate wall portions, and a flanged closure of corresponding shape drawn from a blank comprising fibrous material and a material of greater impermeability than said fibrous material, said closure being disposed within said shell and having the flange thereof in close fitting relation with the inner surface of said shell and the marginal portion of said shell being folded into overlapping relation with said flange and secured thereto by a reactivatable adhesive entirely around the periphery thereof to form a multiple-ply closure seam.

29. In a container, a shell comprising fibrous materials, said shell having straight and arcuate wall portions and an internal rib in the wall thereof, and a flanged head of corresponding shape drawn from a blank comprising fibrous and foil laminations, said head being disposed within said shell against said rib and having the flange thereof in close fitting relation with the inner surface of said shell and secured in place by a previously applied and reactivated adhesive.

30. The combination in a container of a body comprising fibrous material and having an oblong cross section with straight wall portions connected by arcuate wall portions, and a flanged closure of corresponding shape and comprising fibrous materials, said closure being disposed within the end of said body and including straight and arcuate flange portions, the margin of said body being curled into overlapping relation with the flange of said closure and secured thereto by a reactivatable adhesive.

31. In a container, a tubular laminated shell comprising a plurality of blanks, each of said blanks being adhesively secured to a contiguous blank throughout the contacting surfaces thereof, and a flanged closure in each end of said shell, the marginal portions of said shell being infolded into overlapping relation with the flanges of said closures and secured thereto by a previously applied and reactivated adhesive.

32. In a container, a tubular laminated shell comprising a plurality of blanks, each of said blanks being adhesively secured to a contiguous blank throughout the contacting surfaces thereof, a liner in said shell including a lacquer film adapted to be rendered tacky, a laminated flanged closure having a lamina of impervious material in each end of said shell, the marginal portions of said shell being infolded into overlapping relation with the flanges of said closures and adhesively secured thereto by said lacquer film.

33. The method of making a container comprising fibrous materials which includes coating at least a portion of one surface of a blank with a composition having adhesive properties, allowing said coating to become dry, forming a tubular body including said blank with the composition coating on the latter inside the body and with the edges of the blank overlapping, securing said overlapping edges together by activating the composition coating therebetween, inserting a flanged closure in each end of said body, and securing said closures in place by activating the composition coating interposed between said body and the flanges of said closures and applying pressure thereto.

34. The method of making a container comprising fibrous materials which includes coating at least a portion of one surface of a blank with a composition having adhesive properties, allowing said coating to become dry, forming a tubular body including said blank with the composition coating on the latter inside the body and with the edges of the blank overlapping, securing said overlapping edges together by activating the composition coating therebetween, inserting a flanged closure in each end of said body, folding the marginal portions of said body into overlapping relation with the flanges of said closures, and securing said closures in place by activating the composition coating interposed between said body and the flanges of said closures and applying pressure thereto.

GEORGE ARLINGTON MOORE.